US011432167B2

(12) United States Patent
Lydecker et al.

(10) Patent No.: US 11,432,167 B2
(45) Date of Patent: Aug. 30, 2022

(54) SELECTIVE UPDATING OF NODES OF A NODAL WIRELESS NETWORK

(71) Applicant: ABL IP HOLDING LLC, Conyers, GA (US)

(72) Inventors: Stephen H. Lydecker, Snellville, GA (US); Sajin George, Somerville, MA (US); Emanuel Paul Malandrakis, Boston, MA (US); Sharanappa Avati, Eindhoven (NL); Mitri J. Abou-Rizk, Newton, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 298 days.

(21) Appl. No.: 16/749,161

(22) Filed: Jan. 22, 2020

(65) Prior Publication Data

US 2021/0227404 A1    Jul. 22, 2021

(51) Int. Cl.
*H04W 24/00* (2009.01)
*H04W 24/02* (2009.01)
*G06F 8/656* (2018.01)
*H04W 88/16* (2009.01)
*H04W 4/80* (2018.01)
*G06F 8/658* (2018.01)

(52) U.S. Cl.
CPC ............ *H04W 24/02* (2013.01); *G06F 8/656* (2018.02); *G06F 8/658* (2018.02); *H04W 4/80* (2018.02); *H04W 88/16* (2013.01)

(58) Field of Classification Search
CPC ....... H04W 24/02; H04W 4/80; H04W 88/16; G06F 8/656; G06F 8/658
See application file for complete search history.

(56) References Cited

U.S. PATENT DOCUMENTS

| 8,705,082 | B2* | 4/2014 | Nakamoto | H04N 1/00973 358/1.14 |
| 8,924,950 | B2* | 12/2014 | McDonald | G06F 8/65 717/170 |
| 2002/0091807 | A1* | 7/2002 | Goodman | H04L 41/0886 709/221 |
| 2015/0245182 | A1 | 8/2015 | Scagnol et al. | |
| 2016/0081160 | A1 | 3/2016 | Vangeel et al. | |
| 2017/0041070 | A1 | 2/2017 | Ryan et al. | |
| 2017/0364348 | A1 | 12/2017 | Klitenik et al. | |
| 2018/0115435 | A1* | 4/2018 | George | G05B 15/02 |
| 2021/0227404 | A1* | 7/2021 | Lydecker | H04W 4/80 |

\* cited by examiner

*Primary Examiner* — Khai M Nguyen
(74) *Attorney, Agent, or Firm* — RatnerPrestia

(57) ABSTRACT

A network has wireless enabled nodes of more than one hardware type. A computing device obtains a software update for one of the node types and sends an announcement of availability through the network. The announcement includes a node type identifier. A node that recognizes the identifier as matching its own hardware type collects the software update through a series of one or more requested packet transfers from the controller. Each packet carrying part of the update also includes the node type identifier. A node of a different type that has received the packets may serve as a source of missing packets to other nodes. Alternatively, nodes needing missing packets can fetch them from the computing device. When the software update is completely received by a node of the identified type, that node reboots and executes the updated software. Any node of another type discards the packets.

14 Claims, 7 Drawing Sheets

SELECTIVE UPDATING OF NODES OF A NODAL WIRELESS NETWORK

TECHNICAL FIELD

The present subject matter relates to techniques and equipment to update nodal device programming, e.g. firmware or other software, over a nodal wireless network.

BACKGROUND

In recent years, nodal wireless networks have been deployed for a variety of monitoring, control and communication purposes. Non-limiting examples of such networks include routed mesh networks and flooding wireless networks. The wireless enabled nodes or nodal devices of such wireless networks typically are intelligent in that each nodal device includes processor-based electronics to control communications and other functions of the nodal device. Typically, the processor and thus the node is configured by programming (e.g. software including executable instructions and/or related data), which often takes the form of firmware.

The nodes of such a wireless packet data communication network occasionally require distribution of firmware (FW) or other software updates. Various approaches to software distribution have been developed and/or deployed. One approach to deliver firmware changes or revisions required that a technician or other individual having a mobile device physically approach each wireless nodal device and initiate an upload of the firmware update from the mobile device via a radio frequency (RF) connection with the respective wireless enabled nodal device. Such an approach is manually intensive and may require an unacceptable amount of time. More automated techniques have been developed.

For example, an Over-The-Air (OTA) update of nodal device programming may initially be delivered via point-to-point connections between a controller and some number of wireless enabled nodes. Thereafter, delivery of the OTA update from one nodal device to another nodal device is triggered based on an update command. In a specific example, a mesh procedure for distribution of the firmware update is triggered based on an update command that is delivered via mesh networking between the wireless enabled nodes. Upon receipt of the update command, each wireless enabled node determines whether or not the respective node has previously received and stored the revision of the firmware. Upon determination that the respective wireless enabled node has stored the revision of the firmware, that node identifies a number of 'neighbor' nodes located proximate the respective wireless enabled node as having not yet received and stored the revision of the firmware. For each respective one of the identified number of proximate wireless enabled nodes: the previously updated node (a) establishes a communications connection of the respective updated node with the respective identified neighboring wireless enabled node; and (b) delivers, via the established connection, the revision of firmware to the respective identified neighboring wireless enabled node. Because the update command is delivered via mesh networking, all of the wireless enabled nodes may see the update command. However, due to structure of the update command and associated detection process in the wireless enabled nodes that receive the command, only those nodes that have previously received the update will prompt their neighbors to be updated. Each time the update command is sent via mesh networking, the number of updated wireless enabled nodes increases. Thus, after sending the update command only a limited number of times, all of the wireless enabled nodes will have received the firmware update without requiring significant manual intervention. This automated firmware distribution approach is relatively effective where the wireless enabled nodes are substantially the same and all utilize the same firmware and/or substantially the same updates thereof.

For a nodal network or system having wireless enabled nodes of different types, e.g. with different radio circuits, processors, memories, sensors or controlled equipment, the different node types require different firmware updates. An automated system example may include wireless enabled nodes forming a mesh and an update manager. The wireless enabled nodes are queried to determine existing hardware versions and/or functionalities. The query is sent via the wireless mesh network. An Over-The-Air (OTA) firmware update communication load includes multiple different wireless enabled node type device firmware images, where each image corresponds to one of the existing hardware versions and/or functionalities of the wireless enabled nodes reported to the manager in response to the query. The update, including the appropriate images, is delivered via point-to-point connections between the update manager and some number of the wireless enabled nodes and/or between wireless enabled nodes, using a procedure similar to that outlined in the preceding paragraph. Upon receipt, individual wireless enabled nodes determine whether a device firmware image is needed and/or which of the firmware images is appropriate and loads only the appropriate image for future use. Transmission of a firmware load for a particular network or system installation, with multiple images, however, may be time consuming and/or utilize excessive bandwidth.

SUMMARY

Hence, there is still a need for further improvement in technologies for updates of software or other programming in a network of wireless enabled nodes. Selective updating of programming in the examples entails exchanges between a controller and one or more wireless enabled node devices.

A system, for example, includes a wireless enabled computing device configured as an update controller and wireless enabled nodes configured into a nodal wireless network with the wireless enabled computing device. The wireless enabled computing device includes a device processor, software storage, and a device radio frequency transceiver. Each respective wireless enabled node includes a node radio frequency transceiver, a node processor, memory, and software stored in the memory for execution by the node processor to implement operations of the respective wireless enabled node. At least one of the wireless enabled nodes is a node of a first type configured to execute stored software of a corresponding first type. At least one other of the wireless enabled nodes is a node of second type different from the first type of wireless enabled node and configured to execute stored software of a corresponding second type different from the first type software.

The device processor configures the wireless enabled computing device to obtain a software update intended for each node of the first wireless enabled node type and send an announcement of availability of that software update, through the wireless nodal network to the wireless enabled nodes. The announcement includes an identifier of the first type of wireless enabled node. The wireless enabled computing device is also configured to receive a packet request from the wireless enabled node of the first type through the wireless nodal network, sent in response to the announcement including the identifier of the first type of wireless enabled node. In response to the received packet request, the wireless enabled computing device sends a number of packets from the wireless enabled computing device through the wireless nodal network to the wireless enabled nodes. Each packet contains the identifier of the first type of wireless enabled node; and various ones of the packets contain different portions of the software update. The respective node processor of the wireless enabled node of the first type configures the wireless enabled node of the first type to accumulate the portions of the software update from received packets to obtain a complete copy of the software update, based on recognition of the identifier of the first type of wireless enabled node in the packets, and to install the complete copy of the software update for future execution. The respective node processor of the wireless enabled node of the second type configures the second type wireless enabled node to discard the received packets including the portions of the software update, based on recognition of the identifier of the first type of wireless enabled node in the received packets.

A method, for example, includes steps of obtaining a software update intended for a first one of a plurality of different types of wireless enabled nodes deployed in a wireless nodal network and operating a wireless enabled computing device to send an announcement of availability of the software update through the wireless nodal network to the wireless enabled nodes. The announcement includes an identifier of the first type of wireless enabled node. The wireless enabled computing device receives a packet request from at least one of the wireless enabled nodes deployed in the wireless nodal network. The packet request has been sent in response to the announcement, based on a determination responsive to the identifier in the announcement that the at least one of the wireless enabled nodes is of the first type. In response to the received packet request, the wireless enabled computing device sends a number of packets through the wireless nodal network to the wireless enabled nodes. Each packet contains the identifier of the first type of wireless enabled node; and various ones of the packets contain different portions of the software update. The method also includes receiving the transmitted packets through the wireless nodal network at the wireless enabled nodes. Based on recognition of the identifier of the first type of wireless enabled node in the packets, each respective wireless enabled node of the first type: (a) accumulates the portions of the software update from received packets to obtain a complete copy of the software update, and (b) installs the complete copy of the software update for future execution. Another wireless enabled node, particularly a node of a second type different from the first type of wireless enabled node, discards the received packets including the portions of the software update, responsive to recognition of the identifier of the first type of wireless enabled node in the received packets.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1:
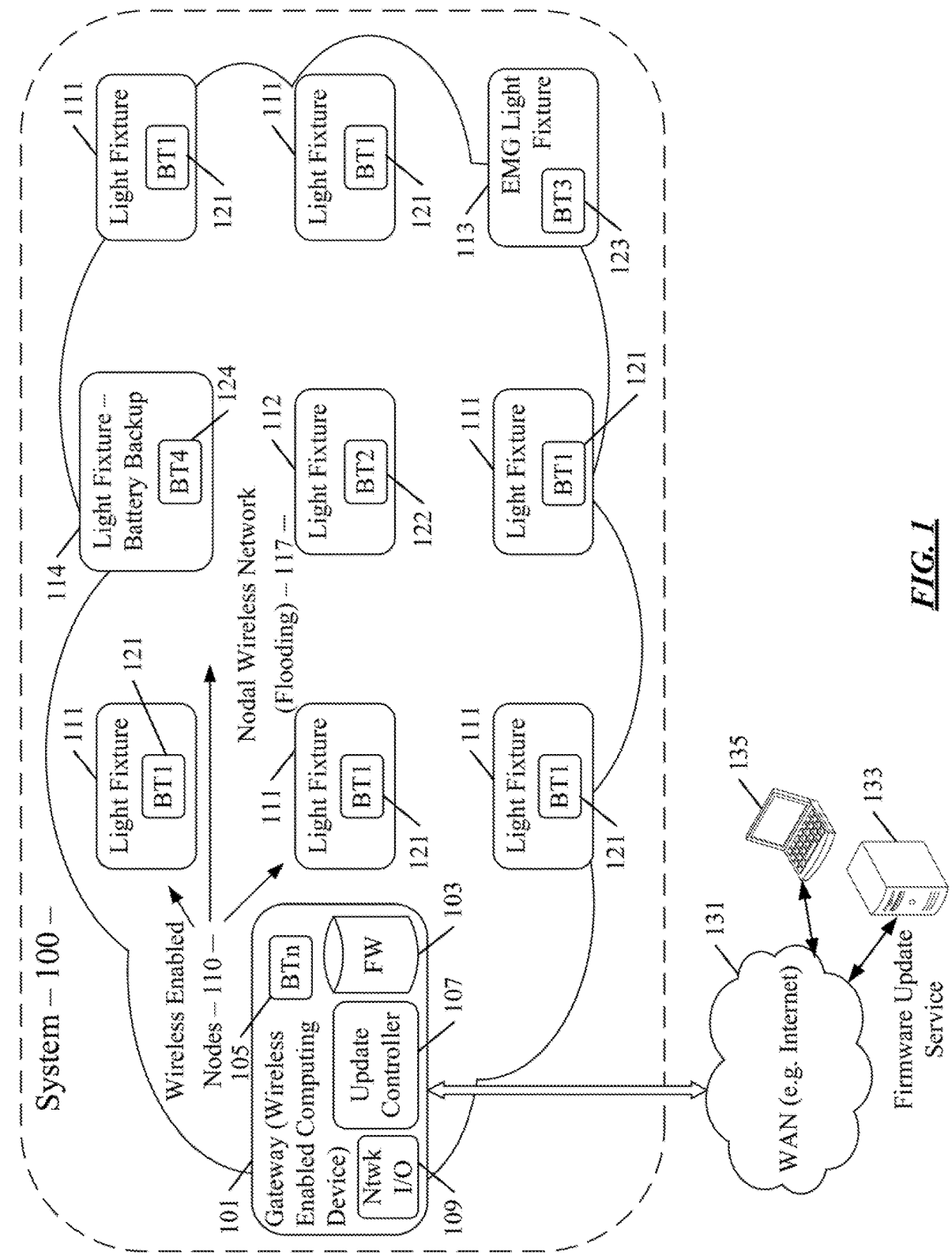
FIG. 1 is a high-level functional block diagram of a system, including wireless enabled nodes and a wireless enabled gateway (example computing device) implementing an update controller.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In methods based on pushing a software update from a controller (e.g. implemented on a server or host computer or implemented on a gateway) to wireless enabled nodes of a network, responsibility for managing implementation and verification devolves upon the controller, which must check that all wireless enabled nodes have accurately received the software appropriate to them and otherwise manage the software distribution. This leads to excessively high complexity at the controller end. In examples referred to below as "selective" software updating, simplicity is achieved by putting each wireless enabled node in charge of collecting its own copy of any applicable software update.

One approach for use in a flooding type nodal wireless network might send all packets of a software update image and flood portions of the software update packet-by-packet to all wireless enabled nodes. All radios at the nodes capture packets of the image of the software update and rebroadcast the packets for communication to other wireless enabled nodes. Wireless enabled nodes that need the image for updating software (e.g. are compatible with the software update) can load and reboot after accumulating the entire software update. Wireless enabled nodes that do not need the image for updating (e.g. are not compatible with the software update) can discard the packets. Then, this process repeats for another image.

Selective software updating in the examples described below and shown in the drawings entails a series of exchanges between a controller and one or more wireless enabled node devices. The controller, for example, a gateway to the nodal network, contains in storage the software update to be distributed. Any wireless enabled node in the network may receive the software update and install the update in its memory for future execution if applicable to the respective node type. The controller typically is connected to the Internet, through which it has received the software update.

Selective software updating envisages networks that typically contain nodes of more than one hardware type or vintage, and which therefore take different software updates. In examples of selective software updating described herein, the update controller first announces the availability of a newly obtained software update to all the nodes of the network, for example a flooding-type network. This announcement includes a "handle" carried in one or more fields of packets. An identifier in the handle serves to restrict the software update to one device type or class of wireless enabled node that is operating on the network. The handle may also indicate the update's size, e.g. the number of packets needed to carry the complete update identified in the handle. A node that recognizes the identifier in this handle as matching its own hardware type identifier, e.g. radio type and/or type of other equipment in or coupled to the node, collects the software update through a series of one or more requested packet transfers from the controller. A node that has part of the software update, e.g. a node of a different type that will not execute the update of the identified type, may serve as a source of missing packets to other nodes in the network, if other nodes that have determined they are missing packets request them. Alternatively, nodes needing missing packets can fetch them from the controller. When the software update has been completely downloaded by a wireless enabled node that needs the update, the node reboots and executes the updated software thereafter. Any node that does not need the update can discard the packets.

The selective software updating repeats for similar communication of updates of software for other types of wireless enabled nodes on the network. In a large network with various numbers of nodes of different types, packet requests for and responsive transmissions of packet subsets for software for different node types may overlap somewhat in real time.

The wireless enabled nodes may be nodes for wireless communication only. In many deployments, however, at least some of the wireless enabled nodes have additional hardware for other purposes. For example, some nodes may include sensors, some nodes may include components to monitor or control equipment (e.g. equipment of a heating, ventilation and air conditioning system, access control system, surveillance and alarm system, or the like). For illustration and discussion purposes, some or all of the wireless enabled nodes in the specific examples have additional hardware for lighting related purposes. Most such nodes may take the form of light fixtures or other types of luminaires that include light sources and associated driver circuitry, although some lighting system type nodes may include lighting related sensors (e.g. occupancy sensors and/or ambient light sensors), whereas other lighting system type nodes may include user interface hardware (e.g. to serve as wall-switches or wall controllers for user control of the luminaire nodes).

Software broadly encompasses executable program instructions and associated data if any that a programmable processor-based device utilizes to implement functions defined by the software. Various combinations of programming instructions and associated data fall under the broad scope of software. Firmware is a category of software. Although firmware may provide an operating environment for complex higher layer application programs; for a lower processing capacity device, such as a wireless enabled node for a controlled system (e.g. fixture or other device in a lighting system), the firmware provides all the programming for the data processing and operational control of device hardware to implement the wireless communications and any other functions of the particular device. The examples of software updating shown in the drawings and described below serve to distribute an update of firmware to wireless enabled nodes of a controlled system (e.g. of a lighting system), although the updating technology may be utilized to distribute other types of software to wireless enabled nodes of various types.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. Examples of luminaires include light fixtures for indoor and outdoor applications, floor lamps and table lamps; although luminaire related aspects of the examples may be implemented in other forms of lighting devices. The actual source of illumination light in or supplying the light for a light fixture or other type of luminaire may be any type of artificial light emitting component, several examples of which are included in the discussions below Terms such as "artificial lighting," as may be used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulb") of any suitable type. The illumination light output of an artificial illumination type luminaire, for example, may have an intensity and/or other characteristic(s) that satisfy an industry acceptable performance standard for a general lighting application.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Light output from the fixture or other type of luminaire may carry information, such as a code (e.g. to identify the luminaire or its location) or downstream transmission of communication signaling and/or user data. The light based data transmission may involve modulating or otherwise adjusting parameters (e.g. intensity, color characteristic or distribution) of the illumination light output from the device.

Reference now is made in detail to the examples illustrated in the accompanying drawings and discussed below. FIG. 1 illustrates an example system 100, which includes a wireless enabled computing device configured as an update controller. Although other computing devices may be used, in the example, the computing device is a gateway 101. The gateway 101 serving as the wireless enabled computing device includes a firmware (FW) storage device 103, such as a hard disk drive or high capacity semiconductor memory. The gateway 101 also includes a processor shown in a later drawing, which executes software programming 107 that configures the gateway 101 as the update controller. The device processor may execute other software to implement other functions of the gateway 101. The gateway 101 also includes a device radio frequency transceiver, which by way of example, may be circuitry in a BlueTooth radio circuit of type n (BTn). This and other radio types will be discussed in more detail later. Other radio technologies instead of or in addition to BlueTooth radios may be used in systems similar to the example system 100.

The example system 100 also includes wireless enabled nodes 110 configured into a nodal wireless network 117 with the gateway 101 forming the wireless enabled computing device. Although other radio technologies may be used, the example utilizes several types of BlueTooth radios (BT1 to BT4) in the example. Although other types of networking or protocols may be utilized, the example network 117 implements a "flooding" type wireless protocol.

Each respective wireless enabled node 110 includes a node radio frequency transceiver, a node processor, memory, and firmware stored in the memory for execution by the node processor to implement operations of the respective wireless enabled node (as shown in later drawing FIGS. 4 and 5). At least one of the wireless enabled nodes is a node of a first type configured to execute stored firmware of a corresponding first type. At least one other of the wireless enabled nodes is a node of second type different from the first type wireless enabled node and configured to execute stored firmware of a corresponding second type different from the first type firmware.

In the example, wireless communication transceivers of the nodes 110 and of the gateway 101 form the nodal wireless network 117. Although the network 117 may use other networking technologies or protocols, the example network 117 is a flooding (e.g. non-routed) type nodal wireless network. In such an example, the nodal network 117 implements a flooding type protocol so as to distribute a transmitted packet from any source on the network throughout the nodal network 117. The gateway 101, for example, is configured to introduce each downstream message packet into the nodal wireless network 117, and the flooding through the network 117 distributes the packet to all of the wireless enabled nodes 110 on that network 117. The payload of the packet is extracted and utilized ("consumed") by each node 110 for which the payload is intended, e.g. based on a destination address of the packet, a group address in the packet, or a node type identifier in the packet. If the same protocol is used for packet communications from the nodes 110, each node 110 is configured to introduce any upstream message packet into the nodal wireless network 117, and the flooding through the network 117 distributes the upstream packet to gateway 101 and to all other wireless enabled nodes 110 on that network 117. Typically, upstream message packets are addressed to the gateway 101, and the payloads thereof are only consumed by the gateway 101 (e.g. to receive acknowledgements of downstream transmission or to receive status reports from light fixtures or other nodes on the network 117). In the selective update example, however, some nodes may also receive and respond to packet requests from other nodes, e.g. to retransmit packets not yet properly received by the other nodes. In some network architectures, such as a BlueTooth implementation, the network 117 may also support some point-to-point communications.

In one example, a message packet is received by all the other devices on the network 117 directly from the sending device. For example, if the gateway 101 transmits a packet, all of the wireless enabled nodes 110 are within range and directly receive the wireless broadcast of that packet. In another example, the message is received by some devices, typically some of the wireless enabled nodes 110; and the packet is retransmitted from some of the nodes 110 to one or more other devices that did not directly receive the initial transmission of the message packet from the sender. For downstream transmissions from the gateway 101, for example, wireless enabled nodes near the gateway 101 directly receive the wireless broadcast of that packet, while nodes further away do not directly receive the packet. Instead, nodes that directly received the packet may retransmit the packet for reception by other nodes. Hence, in an installation covering a large area, distribution of packets to all wireless enabled nodes 110 may involve hops or jumps through multiple nodes in order to distribute a particular message packet from the gateway 101.

In one example implementation of the flooding protocol, each node 110 that receives a packet determines if the respective node has previously seen the packet. When first received, the node stores an identifier from the packet. Then, when a packet is newly received, the node can determine if it has a stored copy of the packet identifier to determine whether or not the node previously received the packet. If previously received, the node can discard the packet without retransmission. If not previously received, the node retransmits the packet.

In another example flooding protocol, messages have a time to live (TTL) parameter in each packet. The TTL may be a set period of time, a set number of hops, or the like. The TTL may also be a configuration setting of how individual nodes are supposed to respond in response to receiving a message. For example, if TTL relates to number of hops, each node may be configured to decrement the TTL setting upon receipt of a message packet and retransmit the packet only if the number is still above zero.

Also, nodes may be configured not to retransmit packets intended for consumption by the particular nodes. In the firmware update example, a wireless enabled node of a first would not retransmit a packet if the node type identifier for the firmware in the handle of the packet indicates the first node type. Continuing with that example, wireless enabled node of a second type (different from the first type) would retransmit a packet if the node type identifier for the firmware in the handle of the packet indicates the first node type, since the content of the packet is not of a type intended for the particular second type wireless enabled node.

As noted above, at least one of the wireless enabled nodes 110 is a node of a first type configured to execute stored firmware of a corresponding first type; and at least one other of the wireless enabled nodes 110 is a node of second type different from the first type wireless enabled node and configured to execute stored firmware of a corresponding second type different from the first type firmware. The example in FIG. 1 includes nodes 111 to 114 of four different types, as discussed in more detail later.

Although the selective software updating technology may be utilized to distribute firmware or other types of software to generic wireless enabled communication nodes, the examples of selective updating serve to distribute an update of firmware to wireless enabled nodes of a controlled system. For example, some nodes may include sensors, and some nodes may include components to monitor or control equipment (e.g. equipment of a heating, ventilation and air conditioning system, access control system, surveillance and alarm system, or the like). For illustration and discussion purposes, the system 100 is a controlled lighting system. In such a system 100, some or all of the wireless enabled nodes 110 have additional hardware for lighting related purposes. Hence, for illustration and discussion purposes, in the example system 100, the wireless enabled nodes 110 take the form of light fixtures or other types of luminaires that include light sources and associated driver circuitry (as shown by way of example in FIGS. 4 and 5). Nodes with sensors or user interface elements are omitted for convenience.

The wireless enabled nodes 110 of system 100 include nodes of at least two different types that use corresponding different firmware images and receive respective different compatible firmware updates. The illustration shows a system 100 in which there are four different types of nodes 111 to 114. Although other arrangements of processor, memory and transceivers may be used, the examples use arrangements in which, in each respective wireless enabled node, the node radio frequency transceiver, the node processor and the memory are elements of a single radio circuit. Such a radio circuit, for example, may include circuits for the node transceiver, node processor and node memory integrated in a single chip device referred to as a system-on-a-chip (SoC). For convenience, further discussion below often focuses on SoC type examples, although as noted, wireless enabled nodes in a system with the selective update technology may use other arrangements of the radio circuitry and/or of the overall circuitry of one or more nodes.

The radio transceivers may implement a variety of wireless communication technologies/standards, such as BlueTooth, WiFi, Cellular 4G or 5G, Zigbee or the like. For illustration and discussion purposes, the examples utilize BlueTooth radios. Since the SoC type radios use BlueTooth, they are identified in FIG. 1 as radios BT1 (121) to BT4 (124). The wireless enabled node type of the light fixtures and thus of the BT radios may differ as to the circuit structure of the radio (e.g. different node processor, node memory with different capacity, or different node transceiver circuit). Structurally different radios will have different firmware images and receive different firmware updates. Even if the hardware structure of the BT radios is the same or similar, the node type may differ if other hardware differs, e.g. if the light fixtures have different artificial light sources and/or different driver circuits. Where the light hardware differs, for illustration purposes, the node and radio types differ (even if the radio hardware is the same) because such different fixtures require that the smart BT radios have different firmware images and receive different firmware updates.

In the nomenclature of the example system 100 of FIG. 1, light fixtures with the same BT number radio are nodes of the same type, having the same radio, having the same lighting hardware (e.g. source and driver circuitry) and therefore utilizing the same firmware image and receiving the same type firmware updates. The BT radios in the example include the processor, memory and firmware for the respective node/fixture types. In the illustration, the light fixtures 111 of node type 1 have BT1 radios 121, e.g. with the same initial generation radio circuitry and the same light source (e.g. same number of LEDs) and thus the same driver hardware. Hence, the light fixtures 111 are wireless enabled nodes of one node type, and the corresponding firmware image for such light fixtures/nodes 111 will be the same.

Although only one is shown, the system 100 includes some number of the light fixtures 112 that have a newer generation radio circuitry BT2 (122). All the light fixtures 112 of the second type will have the same light source as each other (e.g. same number of LEDs) and the same driver hardware as each other. In the example, the BT1 and BT2 radios 121 and 122, however, have different types of node processor and/or node memories having different storage capacities. The BT2 firmware image may be the same for some number of fixtures 112 if there are two or more light fixtures with the BT2 radio at the particular premises/installation. The light fixtures 111 and 112 may have a light source and driver circuitry similar to or different from those in the light fixtures 111. Due to the difference in processor and/or memory capacity of the BT2 radio from the BT1 radio, however, the firmware image for light fixtures 112 will be the different from the firmware image for the light fixtures 111. Also, the type 2 light fixtures/nodes 112 will receive corresponding type 2 firmware updates that are different from the type 1 firmware updates for the light fixture/nodes 111.

For example, earlier generation light fixtures such as the light fixtures 111 may have used a Nordic RF51 radio type SoC chip shown in the example as radio BT1 (121). Newer model light fixtures 112 may use a Nordic RF52 radio type SoC chip shown in the example as radio BT2 (122). The RF51 chip includes a M0 ARM type processor, whereas the RF52 chip includes a M4 ARM type processor. The different RF51 and RF52 radio chips also have different amounts of flash memory, e.g. the RF52 has more flash memory and can store a larger firmware image for execution by the more powerful M4 ARM processor than in the RF52 chip. As a result, the RF51 type radios BT1 (121) and RF52 type radios BT2 (122) require different firmware images and receive different firmware updates.

Continuing with the illustrated example, a given lighting system installation 100 may have additional light fixture type wireless enabled nodes with other lighting hardware for special purposes. As a result of lighting hardware differences, such nodes are different node types, for purposes of firmware images and updates.

By way of a first example of such an alternate type fixture/node, an emergency light fixture 113 has a BT3 type radio 123. Some existing lighting systems use dedicated emergency lighting devices that switch or remain on when the lighting system of a building experiences a power outage. These lighting systems require emergency lighting devices in addition to the light fixtures used for normal illumination. The emergency light fixture 113 may provide path of egress illumination in an emergency, particularly an emergency that causes a loss of normal mains power to the regular illumination light fixtures in a particular premises, such as fixtures/nodes 111 and 112. The BT3 radio circuit 123 in the emergency light fixture node 113 may be similar to the BT1 radio 121 or similar to the BT2 radio 122, but the power supply circuitry and light source may be different from the source(s) and driver circuit(s) used for the general illumination light fixtures 111 and 112. Hence, at least due to lighting hardware differences, the firmware image for any emergency light fixtures 113 as stored and executed in the BT3 radio 123 will be different from the firmware for light fixtures 111 and 112 stored and executed in the respective radios 121, 122. As a result, the type 3 light fixture/node 113 will receive different type firmware updates. The firmware image and updates for the BT3 radio node, however, may be the same for some number of fixtures 113 if there are two or more emergency type light fixtures/nodes 113 at the particular premises installation.

As an alternative or in addition to dedicated emergency lighting, a lighting system 100 may utilize one or more instances of a single/integrated lighting fixture 114 for both normal illumination and emergency illumination purposes thereby eliminating the need for a separate set of (or so many separate) emergency lighting devices. The fixture 114 is thus yet another type of wireless enabled node in the example. The radio hardware circuitry BT4 (124) and possibly the light source in the dual purpose light fixture type node 114 may be similar to those of light fixtures 111 or 112, but the power supply and thus the driver circuitry will be different from those used for the general illumination light fixtures. The emergency operation of these light fixtures 114 typically requires detection of normal AC power loss by a device that also is powered by a separate emergency circuit when needed, requiring additional high voltage wiring to the light fixtures 114. Hence, at least due to hardware differences, the firmware image for any dual purpose light fixtures 114 will be the different from the firmware for light fixtures 111, 112 and/or 113, although the 114 firmware image may be the same for some number of fixtures 114 if there are two or more such light fixtures 114 at the particular premises/installation. Stated another way, for the operation to provide both general illumination and emergency illumination, the smart radio BT4 (124) that controls operation of the type 4 light fixture/node 114 uses yet another type of firmware image and receives another different type of firmware updates.

A system like the system 100 in the example may include other types of light fixtures and/or other types of luminaires requiring different firmware images and receiving additional types of firmware updates. Also, although not shown, other lighting system elements such as wall controllers and sensors may be implemented as wireless enabled nodes in a system like the system 100. Each such additional type of wireless enabled node for any additional type of light system element would use yet another different type of firmware image and would receive an additional different type of firmware update.

In the example of FIG. 1, the wireless enabled computing device is a gateway 101 in that it supports communications between the nodal wireless network 117 and one or more external networks, such as the wide area network (WAN) 131. The WAN 131 may be the Internet or an Intranet or the like. For communication with the WAN 131, the gateway 101 type computing device includes an appropriate network input/output (I/O) interface 109.

The drawing shows a host or server type network-connected computer 133 and a laptop type user terminal device 135, as non-limiting examples of external equipment that may communicate with the system 100 via the network 131 and the gateway 101, for various data gathering or control purposes. For purposes of selective firmware updating, one or more servers 133 on the WAN 131 may offer firmware updates as a cloud based service. Such a server 133 may advise the gateway 101 when an update is ready for wireless enabled nodes of a particular type, via the WAN 131; and the gateway 101 communicates with the server to download any available update for a type of node on the network 117 into storage 103 of the gateway.

In general, the device processor configures the wireless enabled computing device (e.g. gateway 101) to obtain firmware updates for the different types of wireless enabled nodes 111 to 114 operating on the network 117, as needed or as they are created and become available for distribution. Description of types 1 to 4 (or first, second etc.) with reference to the fixtures/nodes 111 to 114 and the associated firmware images and updates are given herein by way of non-limiting example only; and it should be apparent that any node/firmware/update type may be considered as the first, second etc.

For example, the device processor may configure the wireless enabled computing device (e.g. gateway 101) to obtain a firmware update intended for each node 111 of a first wireless enabled node type (designated type 1 for this example only). The firmware update may be obtained from storage 103 if created and saved locally, or the update may be obtained from a server 133 of a cloud based firmware update service and temporally saved in the firmware storage 103 for use in the update procedure. The device processor may similarly configure the wireless enabled computing device (e.g. gateway 101) to obtain a firmware update intended for each node 112 of a second wireless enabled node type (designated type 2 for this example only), to obtain a firmware update intended for each node 113 of the third wireless enabled node type (designated type 3 for this example only), and to obtain a firmware update intended for each node 114 of the fourth wireless enabled node type (designated type 4 for this example only). Additional updates may be similarly obtained for nodes of any additional wireless enabled node type configured in the network 117 at the particular premises installation.

Having obtained a firmware update, the device processor also configures the wireless enabled computing device (e.g. gateway 101) to send an announcement of availability of the firmware update, through the wireless nodal network 117 to the wireless enabled nodes 110. As mentioned earlier, the network 117 in the example implements a flooding protocol for at least some message communications, including at this point in the updating example for the communication of the update availability announcement. In such an example, the gateway 101 effectively broadcasts the announcement that it has the firmware update to distribute, and the system 100 spreads the announcement to all nodes 110 via the flooding protocol of the network 117. The announcement includes a "handle" having at least an identifier of the first type of wireless enabled node, in this present example of the selective update distribution. In examples discussed more later, the handle includes a packet count that will carry the total content (e.g. all the programming and any associated data) of the available firmware update.

Assume for purposes of further discussion that the update is intended for type 1 fixtures, in this case wireless enabled nodes 111 having BT1 type radios 121. The announcement in this example includes the node type identifier corresponding to the light fixtures 111 having the first type/configuration radio BT1 (121). The wireless enabled computing device (e.g. gateway 101) is also configured to receive a packet request from at least one of the wireless enabled nodes 111 of the first type through the wireless nodal network 117 sent in response to the announcement including the identifier of the first type of wireless enabled node.

In response to the received packet request, the wireless enabled computing device (e.g. gateway 101) sends a number of packets from the wireless enabled computing device through the wireless nodal network 117 to the wireless enabled nodes 110. Each packet contains the identifier of the first type of wireless enabled node. Various ones of the packets contain different portions of the firmware update. If a total packet count number is given in the handle of the announcement for example, the handle of each bearer packet contains a sequence number corresponding to the number of the include portion of the update included in the payload of the respective packet.

The gateway/device 101 may send a sufficient number of packets to communicate the entire image for the firmware update in one sequence, e.g. depending on parameters such as the image size, the packet payload size and the memory capacity of the particular node type. In other examples, the gateway/device 101 sends a smaller number of packets in response to an initial request, waits for a time, receives another request and sends more packets; and the sequence of request and packet transmissions repeats until enough packets are sent to communicate a complete copy of the firmware update.

The respective node processor of a wireless enabled node of the first type, e.g. of any fixture/node 111 configures the wireless enabled node of the first type to accumulate the portions of the firmware update from received packets to obtain a complete copy of the firmware update and to install the complete copy of the firmware update for future execution. In an example using a total packet count in the announcement and sequence numbers in the bearer packets, a complete copy of the update may be compiled by extracting the contents from all the appropriately numbered packets in the sequence up to the total count number indicated in the announcement and ordering the extracted contents based on sequence numbers. Some packets may be received multiple times by a wireless enabled node of the first type but may be disregarded if that particular node has already received a packet with the same sequence number. Also, if a node of the first type fails to receive a packet of a particular expected number in the sequence, it can request a retransmission of the omitted packet.

The respective node processor of the wireless enabled node of the second type (e.g. of any of the fixtures/nodes 112 to 114 in the example) configures the other type(s) of wireless enabled node(s) to discard the received packets including the portions of the first type firmware update, based on recognition of the identifier of the first type of wireless enabled node (an identifier not matching the node type(s) of such other wireless enabled nodes 112 to 114).

The example so far distributed a firmware update for the first type of wireless enabled nodes, e.g. the light fixtures 111 of system 100 in the drawing. The system 100 implements similar procedures to obtain, distribute and install firmware updates of different respective types of the other types of wireless enabled nodes 112 to 114 (and any other additional node types on the network 117).

Figure 2:
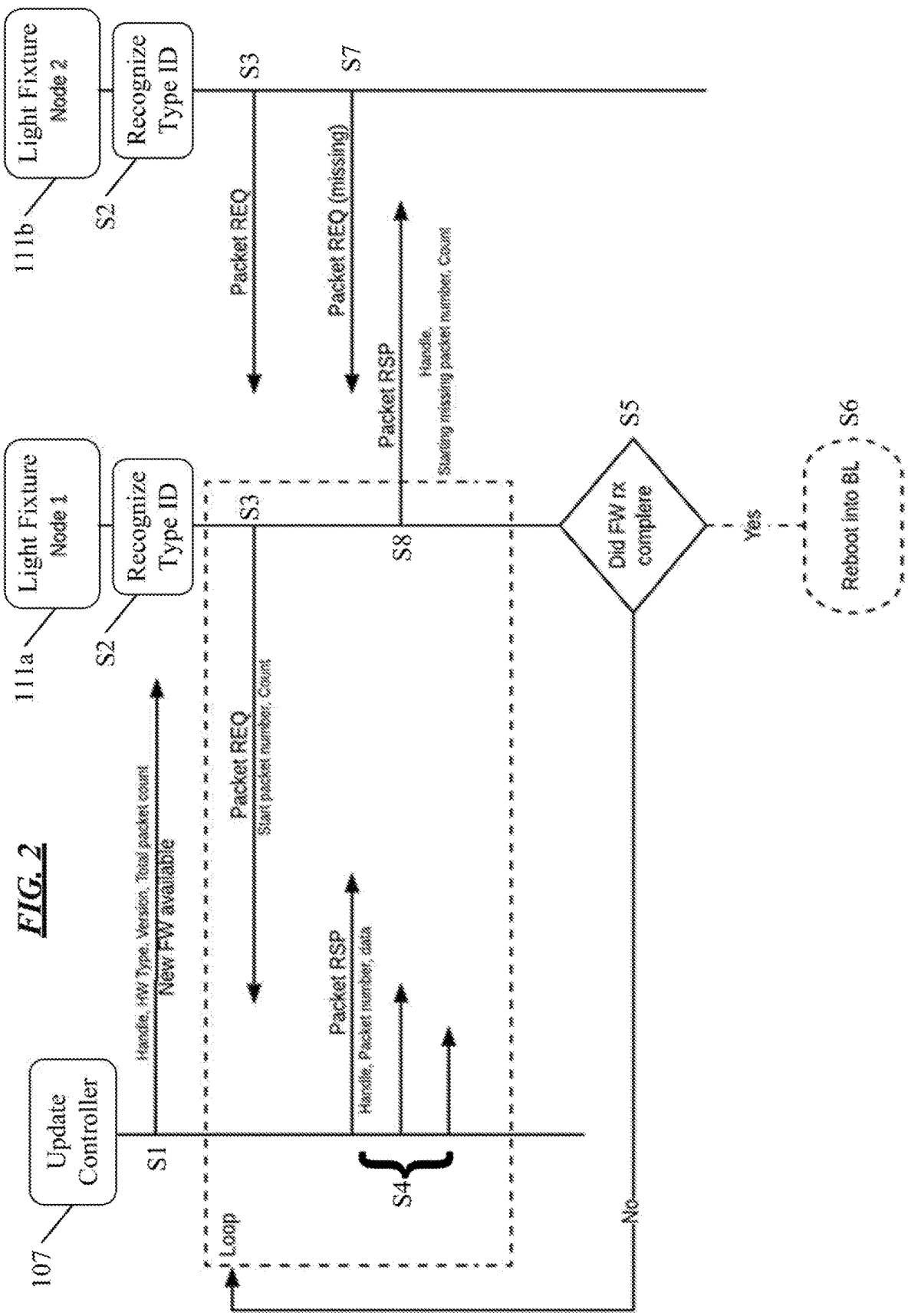
FIG. 2 is a signal flow diagram, which depicts an example of a basic flow of message exchanges among a controller and two wireless enabled nodes.

FIG. 2 depicts the basic flow of message exchanges among a controller and two illustrative wireless enabled nodes, one computing device has a firmware update available for distribution. In this example, both node 1 and node 2 are wireless enabled nodes of the same node type, for example, first type fixture/nodes 111a and 111b having the same type BT1 type radio 121 like in the fixtures/nodes 11 shown in FIG. 1. The series of exchanges between the controller and Node 1 is as follows.

In step S1, the update controller broadcasts an announcement that new firmware update is available. The "handle" portion of the announcement includes an identifier for the hardware type that should install the firmware update and, in this example, the overall total packet count for transport of the complete firmware update. If the nodes targeted for the available update are first type nodes 111 having type BT1 type radios 121 like in the fixtures, for example, the identifier in the handle would identify that first node hardware type. The handle portion of the announcement may also include other information, such as a version number for the newly available update. As outlined above with regard to the system 100 of FIG. 1, the wireless nodal network 117 distributes the announcement of availability to all of the wireless enabled nodes 110 on the network 117.

In step S2, each first type light fixture/node 1 (111a or 111b) receives the announcement and, in this case, recognizes from the type identifier in the handle that it should collect and install the identified firmware update.

Node 1 (111a) may accumulate the packet in random access memory (RAM) and forward it to other wireless enabled nodes in its vicinity (i.e., rebroadcasts the packet). If Node 1 or any other wireless enabled node recognizes from the packet's handle that the packet is not relevant to its own hardware, the wireless enabled node accumulates the packet in RAM but does not perform the further steps 4-9 below to capture the complete update and install the update for future execution. It does, however, share any packet it has in RAM with any wireless enabled node that requests that packet, thus acting as a "friend" to other wireless enabled nodes in the firmware distribution process. Such a node of the other type will discard the packets containing the update firmware, e.g. after the update procedure is otherwise completed by the targeted type one nodes. This process both other nodes is discussed further below with reference to the Node 2 portions of FIG. 3.

Returning to the nodes of the type identified in the handle of the announcement, e.g. first type nodes 1 (111a) and 2 (111b), one or more of the nodes send a packet request upstream through the network 117 to the update controller 107 on the gateway 101. Such a transmission is responsive to a determination by the node processor of the node 111a or 111b that the node type identifier indicates the particular type of hardware in the respective node 111a or 111b, in the example, that the node 111a or 111b is a wireless enabled node of the first type. If multiple nodes transmit multiple requests, the controller may parse out duplicate requests. The controller may also queue non-duplicative requests, e.g. requests for subsets of packets at different points in the overall packet sequence of the announced update or requests for packets of different firmware updates identified in one or more other announcements.

For ease of illustration of an example, in step S3, the node 1 (111a) transmits a packet request (Packet REQ message) through the wireless nodal network 117 to the controller 107 on the gateway 101. The Packet REQ repeats back the original announcement's handle (e.g. at least the node type identifier) to the controller. The packet request in the example also specifies a starting packet sequence ID number and a subset packet count (generally a fraction of the total firmware update packet count). The packet ID number from the sequence together with the fraction of the total count identify a specific packet group or range forming a subset of packets from among the overall sequence that will carry the particular firmware update. The request thus identifies a number of the packets that the controller is to send to Node 1 in response to the particular request, which at this point in the discussion would be the initial subset of the packets.

In response to the received packet request, the wireless enabled computing device (gateway 101) sends a number of packets through the wireless nodal network to the wireless enabled nodes. Each packet contains the identifier of the first type of wireless enabled node; and various ones of the packets contain different portions of the firmware update. Hence, in step S4 of the example in FIG. 3, the controller 107 on the gateway 101 responds to the packet request by sending a series of response packet (Packet RSP) messages to the node 1 (111a). Each of these response packets repeats the handle and also includes a packet ID number in the range indicated in the request and data (a portion of the firmware update). A fixed delay between Packet RSP messages increases the probability of orderly, successful receipt. In the example with a starting packet ID and fraction in the packet request, the controller sends the requested packets in the range identified by the starting packet ID fraction of the total packet count. In a flooding network implementation, a wireless nodal network like 117 can distribute each of the transmitted packets to all of the nodes 111 on the network (see FIG. 1).

The receiving node 1 (111a) accumulates the series of Packet RSP packets (sent in S4) from the controller. Since the number of Packet RSP packets to be sent by the controller is known to the node 1 (based on the fraction of the total packet count in the packet request), and each Packet RSP has a unique ID in the overall packet sequence for the update, the receiving node 1 (111a) can determine when it has received all of the currently expected Packet RSP messages. Although not shown, if one or more Packet RSPs are missing (or corrupt, as determined at a lower level of the protocol), the receiving node 1 (111a) requests the missing or corrupt packet(s) from the controller.

In step S5, upon collecting all Packet RSPs expected on the basis of its most recent Packet REQ, the receiving node 1 (111a) determines if it has received the all packets needed to accumulate the portions of the firmware update so as to obtain a complete copy of the firmware update. If not, processing at the node 111a braches from step 5 to loop back to begin another request/receive process by sending another Packet REQ message in step S3. The new request includes a new packet ID or sequence number specifies the fraction of the total packet count, to effectively identify the number of packets in the next segment of firmware update packets. In response, the controller 107 on the gateway 101 responds to the subsequent packet request by sending the next series of response packet (Packet RSP) messages to the node 1 (111a). In a flooding network implementation, a wireless nodal network like 117 can distribute each of the transmitted packets to all of the nodes 111 on the network (see FIG. 1).

The loop through steps S3 to S5 continues so long as the node 1 (111a) does not yet have all of the packets with portions of the firmware update. At S5, when node 1 (111a) has received and accumulated the entire firmware update, processing branches to step S6. The node 1 (111a) ceases to loop for acquiring packets and installs the complete copy of the firmware update for future execution. In the example, the node processor of that particular node reboots into bootloader (BL) mode with the new firmware. Updating is complete for node 1 (111a).

During the process just described, the controller 107 may send out one or more additional firmware update announcements with different handles, targeting one or more other hardware models in the wireless nodal network 117. Each wireless enabled node 110 independently and concurrently collects its appropriate firmware update selectively from the controller as shown for node 1 (111a) in FIG. 2. A wireless enabled node 110 that is actively collecting a given firmware update for itself is not available to act as a "friend" for distributing of other firmware updates (those with different handles). While actively collected an update for itself from received packets, a node can only act as a "friend" for distributing the firmware update that it is collecting.

FIG. 2 (right side) also depicts how node 1 (111a) may act as a "friend" for a similar type node 2 (111b). Node 2 (111b) may typically receive packets carrying the firmware update for the first type nodes via flooding through the network 117 similar to the communications from the controller 107 to the node 1 (111a) and will normally implement a process (steps not separately shown) similar to steps S2 to S5 discussed above relative to the first node 111a. During those steps, the processor in the similar type node 2 (111b) may determine that one or more Packet RSPs are missing (or corrupt, as determined at a lower level of the protocol). In that situation, the node 111b could request the missing or corrupt packets from the controller as did node 1 (111a). In the example, however, the node 111a has the missing packet(s), and the second node 111b can transmit a request for any missing packet (or ranges of packets) that Node 2 has found it is missing, as shown at step S7, to the node 1 (111a) through the network. This packet request specifies the missing packet by packet ID or a range of packets by starting packet ID and fraction or number of packets. Acting as a "friend," the node 1 (111a) in step S8 can respond to each requests for a specific packet (or ranges of packets) that node 2 (111b) has found it is missing. This speeds receipt by node 2 of the missing packets, as compared to fetching from the controller, and reduces the controller's transactional load.

Although only two wireless enabled nodes are shown in FIG. 2, many wireless enabled nodes in a network might be receiving firmware updates simultaneously, and acting as "friends" to each other. In one example, only part of the firmware update is held by node 1 (111a) or any other wireless enabled node 110 in RAM at any given time. Other parts of the update and transferred to flash memory, the ultimate destination of the complete copy of the firmware update. Node 2 (111b) can only receive requested packets from node 1 (111a) if they still reside in RAM in node 1 (111a); otherwise, node 2 (111b) must eventually fetch the needed packets from the controller 107. In principle, however, and in possible alternate example implementations, any packet that a wireless enabled node 110 holds in either RAM or flash memory might be shared with another wireless enabled node 110.

In this "Friend" example, the node 1 (111a) of the first type received a packet request for at least one of the received packets that is missing or corrupt, from a requesting wireless enabled node 2 (111b) that did not successfully receive the packet(s) from the gateway. In response, the node 1 (111a) of the first type transmits the requested received packet(s) through the wireless nodal network 117 for at least the requesting wireless enabled node 2 (111b). If flooded through the network 117, the transmitted packet(s) also may be received and consumed by other nodes 111 of the first type, e.g. if previous transmission of the packet(s) from the gateway was unsuccessful at other nodes 111 of the first type.

Figure 3:
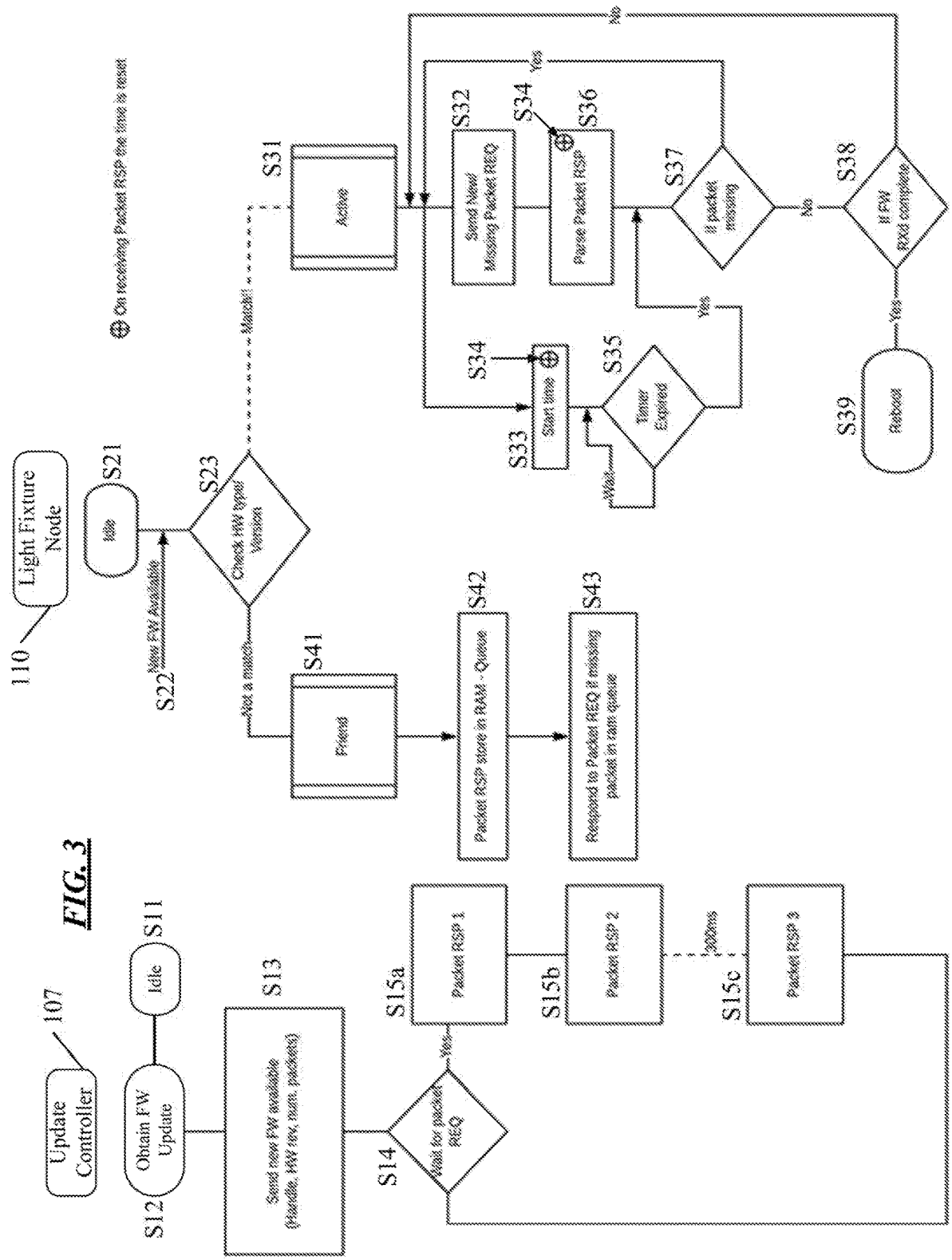
FIG. 3 is a logical flow chart, illustrating details of an example process flow of states in the controller (left) and a wireless enabled node (right) during an update process.

FIG. 3 is a logical flow chart (rather than the signal flow diagram of FIG. 2), which details the flow of states in the update controller 107 (left) and of a typical wireless enabled node 110 (right) during the selective firmware update process. The operations of the controller 107 (left) are shown in the flow chart of FIG. 3 and represent somewhat more detail than the corresponding aspects of controller operation in the signal flow of FIG. 2.

The light fixture node 110 in FIG. 3 may be a node of the first type corresponding in type to the identifier in the announcement and update packets or a node of a different type. Some aspects of the flow of node operations in FIG. 3 expand on aspects of the node operations in FIG. 2 which the node identifier in the announcement and update packets match the type of node 110 (far right starting at S31). Other aspects relate to node operations when the node receives packets with a different node type identifier but acts as a "Friend" to other nodes that may need received packets (somewhat in the middle starting at S41).

At a high level, it should be apparent from the flows in FIG. 3 that the more complex role has been assigned to the individual wireless enabled node 110, with the controller 107 acting merely as an annunciator and on-demand distributor or server of firmware packets. The controller waits a conservative, fixed time (presently 300 msec) between Packet RSP transmissions in order to give each Packet RSP time to propagate to the target wireless enabled node(s) and be received.

FIG. 3 shows the update controller 107 initially in its idle state (S11) and shows the light fixture type node 110 initially in its idle state (S21). In step S12, the update controller 107 obtains a firmware update intended for one of various different types of wireless enabled nodes deployed in the wireless nodal network 117 of FIG. 1. The controller 107 causes the wireless enabled computing device to send an announcement of availability of the firmware update (at S13) through the wireless nodal network 117 to the wireless enabled nodes. As shown in FIG. 3, the wireless enabled light fixture node 110 may be presumed to be in an idle (available) state at S21 until the firmware update announcement is received at S22 from the update controller 107. As discussed earlier, the "handle" portion of the announcement includes an identifier for the hardware type for the nodes that should install the firmware update and may include other information such as the overall total packet count for transport of the complete firmware update and/or a firmware version identifier for the newly available update. After sending the availability announcement, the update controller 107 waits for a packet request (REQ) as shown at step S14.

At the node 110, the next step (S23) after receiving the announcement is a check of whether or not the hardware (HW) type identifier in the announcement handle matches that of the particular wireless enabled node 110. If there is a match at S23, processing branches to an active state S31. If there is not a match at S23, meaning that the particular node 110 is a different type of node than that indicated by the node type identifier in the firmware update availability announcement, then processing instead branches to a state S41 in which the node 110 may act as a "Friend" for nodes of the type corresponding to the identifier in the announcement.

Consider first the case in which the hardware type in the announcement handle matches that of the wireless enabled node, and therefore the wireless enabled node 110 enters the active state at S31. The node processor for respective node 110, oversees its own accumulation of the firmware update in preparation for reboot. The Active wireless enabled node 110 cycles through a number of states as needed to implement the exchanges with the update controller 107, for sending Packet REQs to the controller, receiving Packet RSPs, and checking for completion of the expected firmware update packet inventory (e.g. the entire image of the update from the content of the specified total number of packets).

In the example process flow, at step S32, the node processor causes the light fixture node 110 to send a packet request (REQ) through the network 117 to the update controller 107 in the device/gateway 101. In an initial response to the announcement or after receiving an expected number of packets in one or more response messages, the request (REQ) sent at S32 will ask the controller 107 for a number of the packets containing portions of the identified firmware update, for example, as in the discussion step S3 of FIG. 2. At other times, however, the packet request (REQ) sent in step S32 of FIG. 3 may be a request for a missing packet or a missing range of packets, similar to the request sent in step S7 in the discussion of FIG. 2.

As in step S3 in the example of FIG. 2, each Packet REQ sent in step S32 of FIG. 3 repeats back the original announcement's handle (e.g. at least the node type identifier) to the update controller 107. The packet request in the examples also specifies a subset or range of packets, e.g. by specifying a first or 'start' packet sequence number and a subset packet count (generally a fraction of the total firmware update packet count). The start packet ID number from the sequence together with the fraction of the total count identify a specific packet group or range forming a subset of packets from among the overall sequence that will carry the particular firmware update.

At this point in the process flow, the update controller 107 has been waiting at S14 for a packet request (REQ). Upon receipt of the packet request (REQ) through the network 117, from the node 110, the update controller 107 transitions processing to begin a series of steps at S15a to send some number of packets of the firmware update back through the network 117 per the received packet request (REQ). Similar to step S4 of the example in FIG. 3, the update controller 107 on the gateway 101 responds to the packet request by sending one or more response packet (Packet RSP) messages to the light fixture node 110. Each of these response packets repeats the handle, and each of these packets includes a packet ID number in the range indicated in the request as well as content data (in this case, a portion of the firmware update). This example shows three packet transmission steps S15a to S15c, although there may be as few as one packet transmission, transmission of two packets or transmission of some number of packets more than three in response to any particular packet request message (REQ). When transmission of the requested packets is complete, the update controller 107 returns to step S14 to wait for another packet request message from a wireless enabled node.

In the Active mode (after S31), when the wireless enabled node 110 sends a packet request (REQ) in step S32, the processor in the wireless enabled node 110 also starts a timer (S33) and enters a loop in which it checks (at S35) to determine if the period of the timer has expired and then waits if the period has not yet expired. If one or more packets are received from the controller 117 (as represented by S34), packet receipt triggers a reset of the timer in S33. This loop continues as packets are received, as long as packets are being received without an intervening delay longer than the period of the timer. Processing branches out of the loop to step S37 if the timer expires, e.g. because a packet response (RSP) has not been received in response to the packet request (REQ) or after receipt of the last of a number of requested packet responses have been received (responsive to controller transmissions S15a to S15c in the example).

Hence, while the timer is running and being reset through the loop S33 to S35, the wireless enabled node typically receives some number of packets containing portions of the firmware update, from the controller 107, based on and/or following the request sent at S32. Receipt of the packets for processing of the contents is shown at S34 inside the step S36 for parsing the packets from the response (RSP). In a flooding type network or in some other types of nodal wireless networks, the node 110 may forward received packets through the network to others of the nodes 110.

As noted, each packet contains the identifier of the one type of wireless enabled node, which at this point in the example is the type identifier that matches the radio hardware type in the particular light fixture node 110 that receives the packets. Upon receipt of the packets, the wireless enabled node 110 parses the packets in step S36 to accumulate contents, in this case portions of the firmware update. The portions of the firmware update are stored in RAM. Although not shown as a separate step, the accumulation of firmware contents in S36 may be based upon detection of the matching type identifier in the received packets. For example, if packets with other type identifiers are received along with the packets containing the matching identifier, the packets with the different node type identifier(s) are not parsed for content extraction but are temporarily use to provide packets to other nodes when operating in the friend state (S41).

After processing (at S36) received packets following a packet request and/or after the timer has expired (at S35), processing reaches step S37. In that step, the processor of the wireless enabled node 110 determines if any of the requested packets is missing. If so, processing branches back to S32 and S33 to repeat the steps for packet request, receipt and timing, although the request is for the missing packet(s) and presumably the wireless enabled node 110 will receive the requested missing packet(s). At step S37, when the processor of the wireless enabled node 110 determines there are no missing packets from the most recently requested subset, processing branches to step S38.

In step S38, the processor of the wireless enabled node 110 determines whether or not the particular node has received and accumulated a complete copy of the firmware update (firmware RXd). For example, the node processor may check whether or not the node 110 has received and accumulated packets having the sequence numbers corresponding to the entire total packet count received in the firmware availability announcement (back at step S22). If not, then the process flow branches back to steps S32, S33 to repeat the steps for packet request, receipt and timing to obtain the next subset of the packets. The steps S32 to S38 repeat to one or more times to obtain additional subsets of packets until the wireless enabled node 110 has accumulated a complete copy of the applicable firmware update, at which time the processing flow branches from S38 to step S39. Although not shown as a separate step, before a reboot at S39, the processor of the node 110 may perform one or more error checks to insure that the firmware update is valid and/or has been received without introducing data errors. When the firmware is completely received (firmware RXd), the firmware may be transferred from RAM to flash memory, and the node processor in the wireless enabled node 110 reboots (at S39). In this way, the wireless enabled node 119 installs the complete copy of the firmware update for future execution. Firmware updating for the wireless enabled node 110 of the type identified in the announcement and the packets is complete.

Returning to step S23, assume now that the node 110 receives an announcement in step S22 in which the handle contains a type identifier that is different from the hardware type of the particular wireless enabled node 110. Stated another way, at this point in the example, if the announcement of availability of the firmware update includes an identifier of the first type of wireless enabled node, then the particular wireless enabled node 110 is a node of a second type different from the type identified in the latest received announcement. Hence, at step S23 at this point in the example, when the node processor checks whether or not the hardware (HW) type identifier in the announcement handle matches that of the particular wireless enabled node 110, the node processor recognizes that there is no match. The processing therefore branches from S23 to the state S41 in which the node 110 may act as a "Friend" for nodes of the type corresponding to the identifier in the latest announcement.

When the hardware (HW) type identifier in the announcement handle does not match that of the particular wireless enabled node 110, the wireless enabled node operating in the "Friend" mode may assist in distributing the update to other wireless enabled nodes. In the example, the wireless enabled node 110 at S42 receives packet response messages (e.g. as sent from the controller 107 in steps like S15a to S15c) and stores at least some number of such packets in RAM. In a flooding type network or in some other types of nodal wireless networks, the node 110 may forward received packets through the network to others of the nodes 110. As noted, the packets contain a handle with the hardware (HW) type identifier, which at this point in the example does not match the type of hardware at the particular wireless enabled node 110. Hence, the node 110 temporarily stores received packets but does not parse the packet contents for installation as in the Active mode (S31 through S39), based on the non-matching node type identifier.

In the step S43 in the example of the "Friend" mode, the wireless enabled node 110 may receive a packet request (REQ) for at least one of the received packets from a requesting wireless enabled node. Typically, the request is for one or more missing packets, identified as discussed earlier. If the node 110 has the requested packet(s) stored in RAM, the wireless enabled node 110 transmits the requested received/stored packet(s) from that wireless enabled node 110 through the wireless nodal network 117 for at least the requesting wireless enabled node. Additional nodes may receive and consume contents from the requested missing packets sent by the "Friend" node 110. In this way, the example node 110 temporarily stores packets in RAM to be shared, if requested, with other wireless enabled nodes.

When all packets for the non-matching hardware type identifier have been received and/or there has been no request for any missing packet for some period of time, the node processor causes the wireless enabled node 110 to discard the received packets (for an identified type that does not match the hardware type of the particular node 110) including the portions of the firmware update. In this "Friend" example, the node 110 discards packets based on the recognition that the identifier of the type of wireless enabled node in the received packets and/or the identifier in the announcement did not match the actual type of the particular node 110.

FIG. 1 and the description thereof provides an overview of a system 100 that may implement selective updating of programming via exchanges between an update controller 107 and one or more wireless enabled nodes 110. FIGS. 2 and 3 and the descriptions thereof provide examples of aspects of the signal and process flows for such selective updating of programming. A system may implement such techniques using a variety of different hardware configurations for the computing device and the wireless enabled nodes. It may be helpful, however, to consider some examples of suitable hardware implementations in a bit more detail.

Figure 4:
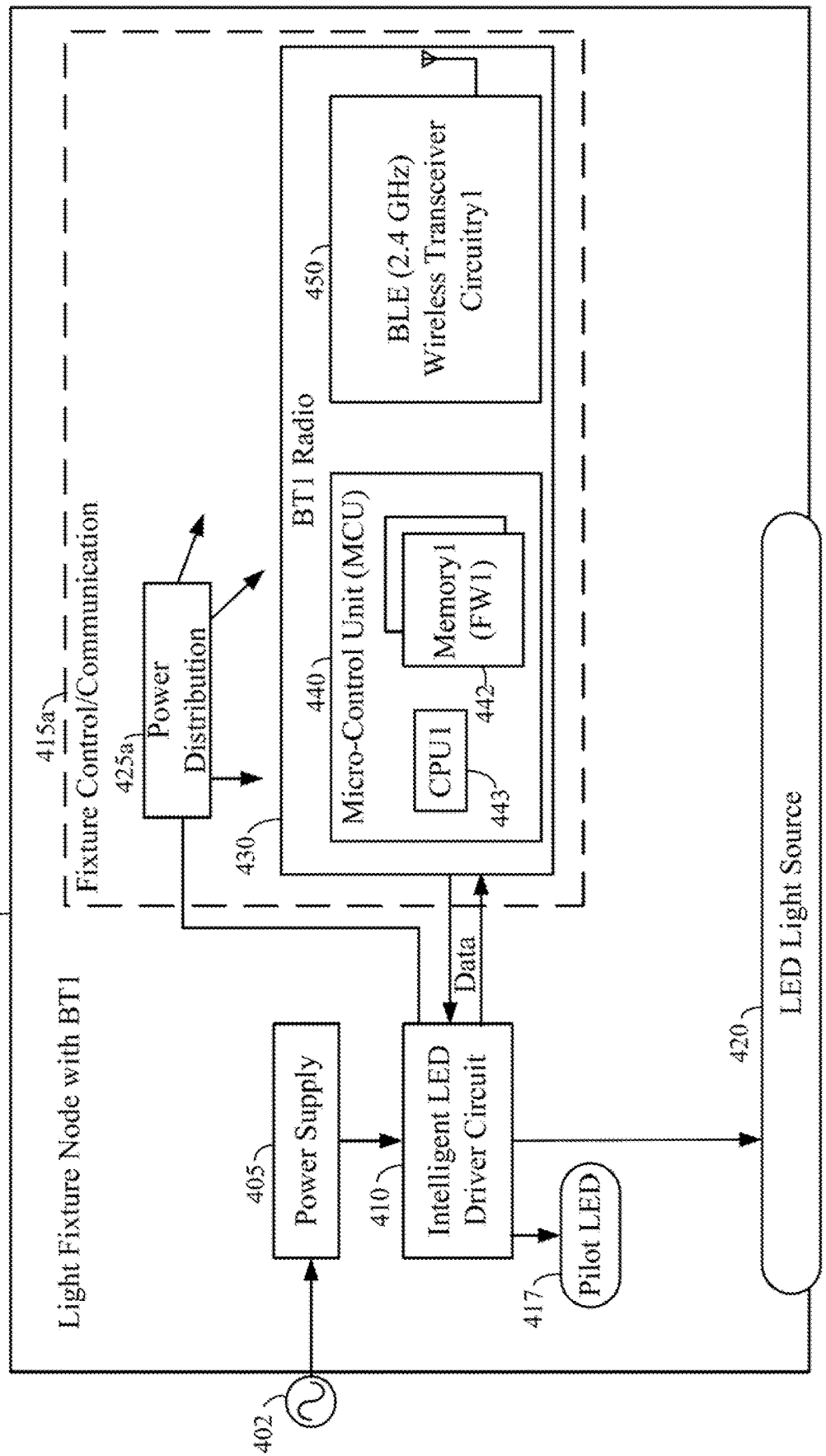
FIG. 4 is a high level functional block diagram of a light fixture example of a wireless enabled node having a first type of radio.
Figure 5:
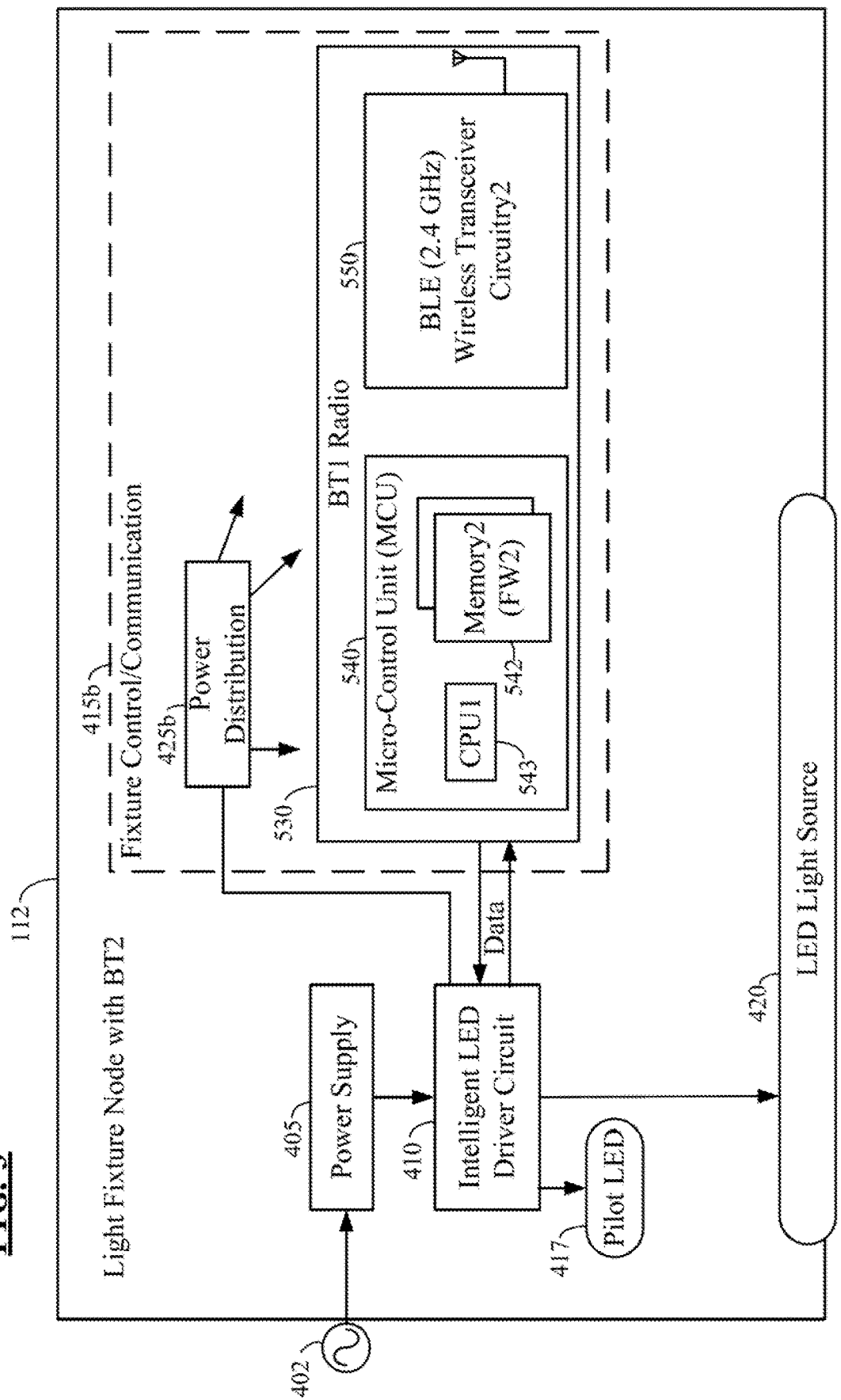
FIG. 5 is a high level functional block diagram of a somewhat different light fixture example of a wireless enabled node, e.g. having a second type of radio different from the first type of radio.

FIGS. 4 and 5 depict logical, functional, and structural features of two examples of radio frequency communication enabled light fixtures suitable for use as two of the example types of wireless enabled nodes in a system like system 100 of FIG. 1. Specifically, FIG. 4 shows an example of a light fixture 111 of node type 1 having a BT1 type radio; and FIG. 5 depicts an example of a light fixture 112 of node type 2 having a BT2 type radio. For convenience, these two examples 111, 112 have a number of elements that may be the same, e.g. the power supply 405, the driver circuitry 420, the pilot LED 417, and the LED light source 420. The common elements of these light fixture type wireless enabled nodes will be discussed first.

In the examples of FIGS. 4 and 5, each light fixture 111 or 112 is an integrated light fixture that generally includes a power supply 405 driven by a power source 402. Power supply 405 receives power from the power source 402, such as an AC mains, battery, solar panel, or any other AC or DC source. Power supply 405 may include a magnetic transformer, electronic transformer, switching converter, rectifier, or any other similar type of circuit to convert an input power signal into a power signal suitable for light fixture 111 or 112. It will be appreciated that the present teachings encompass light fixtures that are not so highly integrated, for example, that include a luminaire that contains the actual light source 420 and a somewhat separate module that includes other elements of the fixture, such as the power supply, driver circuitry and the fixture control/communication system 415.

In the examples of FIGS. 4 and 5, each integrated light fixture type wireless enabled node 111 or 112 includes a light source and an associated driver circuit. Various types of illumination light sources may be used, such as one or more solid state light emitters, fluorescent lamps, halogen lamps, metal halide lamps, high intensity discharge lamps or the like. Examples of solid state emitters include silicon or gallium nitride based light emitting diodes (with or without incorporated luminescent material such as a phosphor); one or more organic light emitting diodes (OLEDs); one or more micro LEDs; one or more nanorod or nanowire LEDs; one or more laser diodes; etc. For purposes of specific examples, each of the fixtures 111 of FIG. 4 and 112 of FIG. 5 includes a light emitting diode (LED) type light source, for example, a number of white type LEDs represented by the LED type light source 420.

Each light fixture type wireless enabled node 111 or 112 furthers includes a driver capable of supplying power suitable to the particular type of light source. In the examples with LED light sources 420, each driver may be implemented by an intelligent LED driver circuit 410. Of course, other LED driver circuits may be used. The intelligent LED driver circuit 410 is coupled to the LED light source 420 and drives that LED light source 420 by regulating the power to LED light source 420. The intelligent LED driver circuit 410, for example, may provide a constant quantity or power to LED light source 420 as its electrical properties change with temperature, for example. The intelligent LED driver circuit 410 may include a driver circuit that provides power to LED light source 420 and operates a pilot LED 417. Intelligent LED driver circuit 410 may be a constant-voltage driver, constant-current driver, or AC LED driver type circuit that provides dimming through a pulse width modulation circuit and may have one, two, three or many channels for separate control of different LEDs or LED arrays.

Intelligent implementations of LED drivers like 410 may include a micro-control unit (MCU), one or more memories and appropriate input/output interfaces such as power output port(s) and data input/output ports. Examples of commercially available intelligent LED driver circuit 410 are available from EldoLED. Example implementations of the LED driver circuit 410 may further include an AC or DC current source or voltage source, a regulator, an amplifier (such as a linear amplifier or switching amplifier), a buck, boost, or buck/boost converter, or any other similar type of circuit or component. LED driver circuit 410 outputs a variable voltage or current to the LED light source 420 that may include a DC offset, such that its average value is nonzero, and/or an AC voltage.

If provided, the pilot LED 417 indicates the state of the light fixture 400, for example, during commissioning and maintenance processes (as distinct from normal illumination operations). The example light fixture type wireless enabled nodes 111 and 112 are line powered and remain operational as long as power is available, although other types of fixtures/nodes may have RF power, inductive power, solar power, battery power or other alternative power instead of or in addition to power derived from AC mains.

Each light fixture type wireless enabled node 111 or 112 in these two examples includes a fixture control and communication module 415a or 415b. Each module 415a or 415b includes power distribution circuitry 425a or 425b to supply power, in the example from an auxiliary power output of the driver circuit 410, to the particular radio circuitry 430 or 530 of the fixture 111 or 112.

The radios 430, 530 in the two wireless enabled nodes 111, 112 are generally similar in that each radio includes a micro-control unit (MCU) and wireless transceiver circuitry. Also, the wireless transceiver circuitry supports at least one protocol that is common to both radios, so that both wireless enabled nodes 111, 112 can communicate over the same nodal wireless network 117 with each other and/or with other wireless enabled nodes 110 or devices like device/gateway 101 in that network 117. The wireless transceiver circuitry in the nodes may be configured to operate in conformance with any suitable wireless protocol. In these examples, the wireless transceiver circuitry is configured to operate in conformance with the Bluetooth Low Energy (BLE) protocol in the 2.4 GHz radio frequency band assigned for use by the BLE protocol. In these examples, however, the BT1 type radio 430 and the BT2 type radio 530 are different in one or more respects, therefore the nodes 111 and 112 are different hardware types. Hence, the processors in the MCUs in the radios of those example nodes receive and execute different firmware updates via selective updating procedures like those of FIGS. 2 and 3.

As shown in FIG. 4, the BT1 type radio 430 of the fixture type wireless enabled node 111 includes a micro-control unit (MCU) 440, and BLE wireless transceiver circuitry 450 of a first (1) type. As shown, MCU 430 is coupled to LED driver circuit 410 and controls the lighting operations of the LED light source 420 via the driver circuity 410. The MCU 440 includes a first (1) type memory 442 (e.g. volatile RAM and non-volatile flash memory or the like) and a node processor in the form of a first (1) type central processing unit (CPU1) 443. The memory 442 stores firmware (FW1) of a first type for implanting the operations of the first type fixture node 111, for lighting control operations, commissioning, maintenance, and diagnostic operations and for controlling communications and/or data processing related to functions of the lighting system 100. For example, the light fixture node 111 may be an early generation fixture that uses a Nordic RF51 radio type SoC chip as radio BT1 430. The MCU 440 of the RF51 chip includes a M0 ARM type processor as the CPU 443, and the MCU 440 of the RF51 chip includes a relatively small amounts of RAM and flash in memory 442.

As shown in FIG. 5, the BT2 type radio 530 of the fixture type wireless enabled node 112 includes a MCU 540, and BLE wireless transceiver circuitry 550 of a second (2) type. As shown, MCU 530 is coupled to LED driver circuit 410 and controls the lighting operations of the LED light source 420 via the driver circuity 410. The MCU 540 includes a second (2) type memory 542 (e.g. volatile RAM and non-volatile flash memory or the like) and a node processor in the form of a second (2) type central processing unit (CPU) 543. The memory 542 stores firmware (FW2) of a second type for implementing the operations of the second type fixture node 112, for lighting control operations, commissioning, maintenance, and diagnostic operations and for controlling communications and/or data processing related to functions of the lighting system 100. For example, the light fixture node 112 may be a newer generation fixture that uses a Nordic RF52 radio type SoC chip as radio BT2 530. The MCU 540 of the RF52 chip includes a M4 ARM type processor as the CPU 543, the MCU 540 of the RF52 chip includes a larger amounts of RAM and flash in memory 542.

The BT2 radio 530, with its more powerful CPU processor and larger memory can store a larger firmware image for execution by the more powerful processor than the BT1 type radio 430. As a result, the RF51 based radio BT1 430 and the RF52 based radio BT2 530, and thus to the two different type wireless enabled fixture nodes 111, 112, require different firmware images and receive different firmware updates via the selective update procedures. The transceiver circuitry 450, 550 may also be somewhat different, e.g. so that 550 is more energy efficient, which may also lead to differences in firmware and updates.

Figure 6:
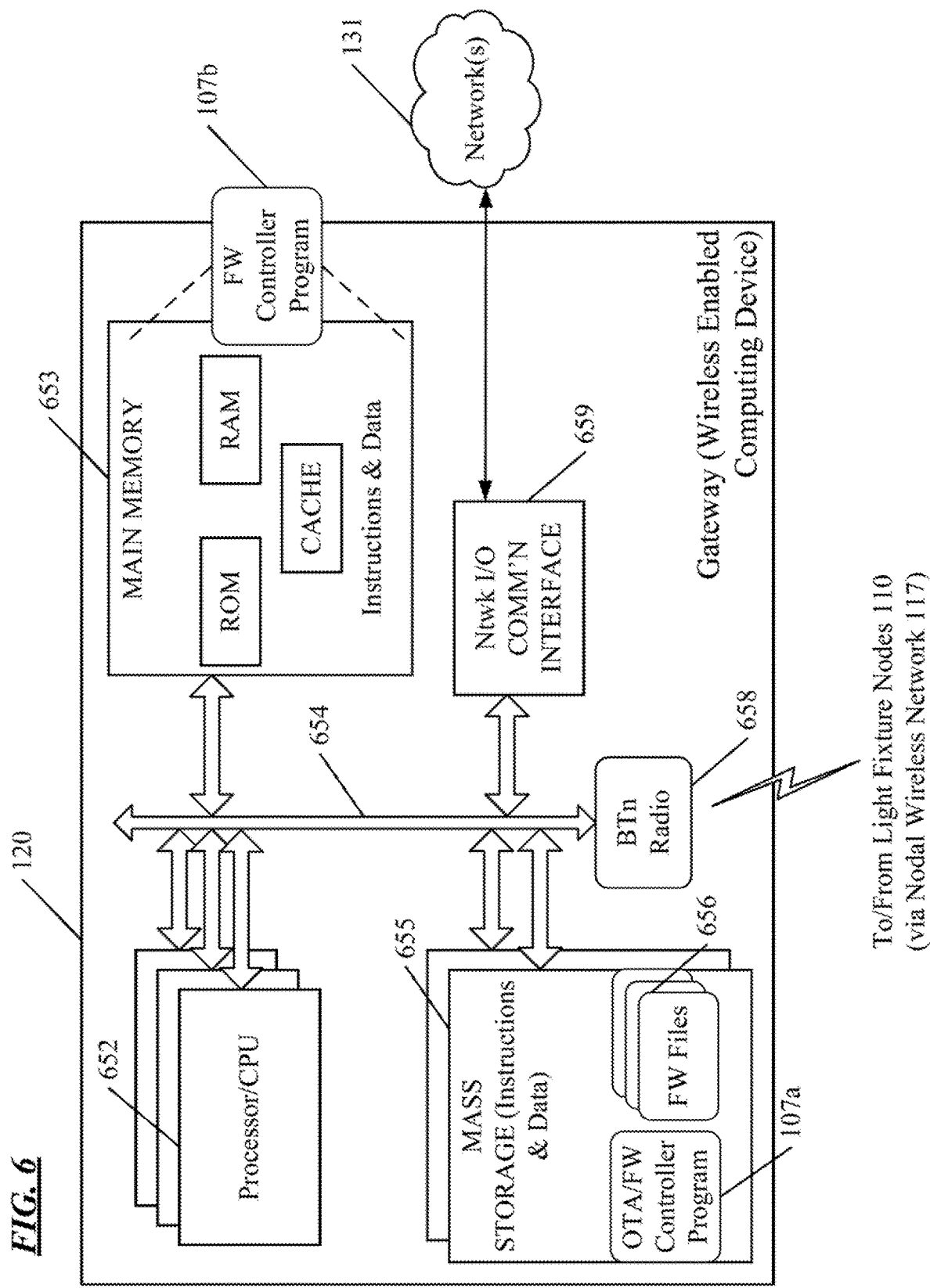
FIG. 6 is a simplified, functional block diagram of an example of a hardware platform for a gateway, as may be used in the example system of FIG. 1.

FIG. 6 is a functional block diagram of a general-purpose computer system, by way of just one example of a hardware platform that may be configured to implement the gateway (wireless enabled computing device) 101. The example wireless enabled computing device 101 will generally be described as an implementation of a server platform or host type computer, e.g. as might be configured as a blade device in a server farm or in network room of a particular premises. Alternatively, the computer system may comprise a mainframe or other type of host computer system capable of web-based communications, media content distribution, or the like via the network 131 and the on-premises nodal wireless network 117.

The computer system 101 in the example includes a central processing unit (CPU) 652 formed of one or more processors, a main memory 653, mass storage 655 and an interconnect bus 654. The circuitry forming the CPU 652 may contain a single microprocessor, the circuitry forming the CPU 652 may contain a number of microprocessors for configuring the computer system 101 as a multi-processor system, or the circuitry forming the CPU 652 may use a higher speed processing architecture. The main memory 653 in the example includes ROM, RAM and cache memory; although other memory devices may be added or substituted. Although semiconductor memory may be used in the mass storage devices 655, magnetic type devices (tape or disk) and optical disk devices may be used to provide higher volume storage.

The gateway type wireless enabled computing device 101 runs a variety of applications programs and stores and processes various information in a database or the like for control of the light fixtures at nodes 110, wall controllers (not shown) and any other elements of the lighting system 100 and possibly elements of an overall building managements system (BMS) at the premises. The programming and stored information includes one or more programs and firmware files related to the selective firmware update technique.

In operation, the main memory 653 stores at least portions of instructions and data for execution by the CPU 652, although instructions and data are moved between memory 653 and storage 655 and the CPU 652 via the interconnect bus 654. For example, the mass storage 655 is shown storing FW files 656, such as updates of firmware for one or more types of nodes 110. A portion or all of such an update file may be transferred to main memory 653 and processed by the CPU 652 to divide the update into portions for transport as contents of a sequence of packets to be sent over the network 117. The gateway device 101 has one or more copies of software programming 107 (FIG. 1) for the firmware (FW) update controller. For example, a copy 107a may be saved for long term storage in the mass storage 655 and when appropriate uploaded to the main memory 653 (as shown at 107b). The main memory 653 stores the software programming 107b as needed for execution by the processor(s) forming the CPU 652. When so executed, the programming 107b and thus the CPU 652 configure the gateway type wireless enabled computing device 101 to perform the functions of the update controller, for relevant aspects of the selective firmware updating procedures described herein.

The CPU 652, memory 653 and 655 may handle programs and files in a similar fashion for other functions of the system 100, such as control of the light fixtures at nodes 110, operation of any wall controllers (not shown) and any other elements of the lighting system 100 and possibly control of elements of an overall building managements system (BMS) at the premises.

The computer system of the gateway 101 also includes one or more input/output interfaces for communications, shown by way of example as a wireless transceiver 658 as well as one or more network interfaces 659 for data communications via the network 131. Although other wireless transceiver arrangements may be used, the example gateway 101 utilizes a Bluetooth type compatible with the particular iteration of Bluetooth protocol utilized on the wireless nodal network 117. The Bluetooth transceiver 658, for example, may be a Bluetooth Radio type BTn similar to any one of the BT1 to BT4 type radios of system 100 or a further type radio specifically adapted for integration and operation in a computing device like that used for the gateway 101 that also is compatible with the applicable Bluetooth protocol. Each interface 659 may be a high-speed modem, an Ethernet (optical, cable or wireless) card or any other appropriate data communications device. The physical communication link(s) to/from the interface 659 may be optical, wired, or wireless (e.g., via satellite or cellular network).

Although not shown, the computer platform configured as the gateway 101 may further include appropriate input/output ports for interconnection with a local display and a keyboard and mouse or with a touchscreen or the like, serving as a local user interface for configuration, programming or trouble-shooting purposes. Alternatively, system operations personnel may interact with the computer system of the gateway 101 for control and programming of the system 100 from a remote terminal device via the Internet or some other link via any network 131

The example FIGS. 1 and 6 show a single instance of a gateway type wireless enabled computing device 101. Of course, the functions of the gateway type device 101 may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like that of the gateway type wireless enabled computing device 101 generally are conventional in nature, and it is presumed that those skilled in the art are sufficiently familiar therewith to understand implementation of the present system and associated lighting control technique using suitable configuration and/or programming of such computer platform(s) based on the description above and the accompanying drawings.

Figure 7:
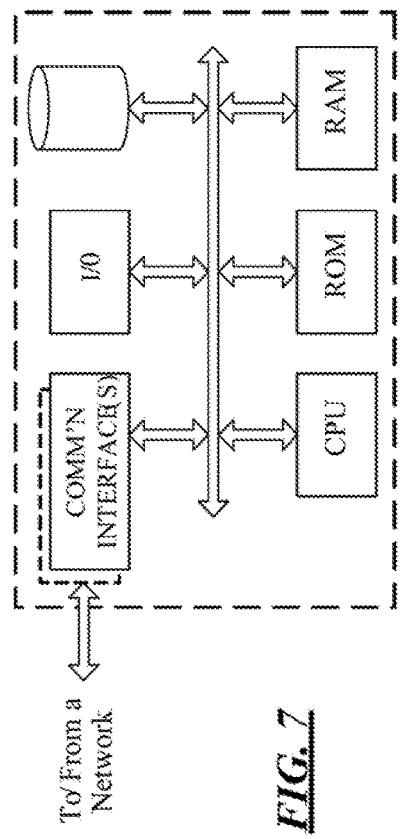
FIG. 7 is a simplified functional block diagram of a computer that may be configured as a host or server, for example, to function as a server for providing updates via the system example of FIG. 1.
Figure 8:
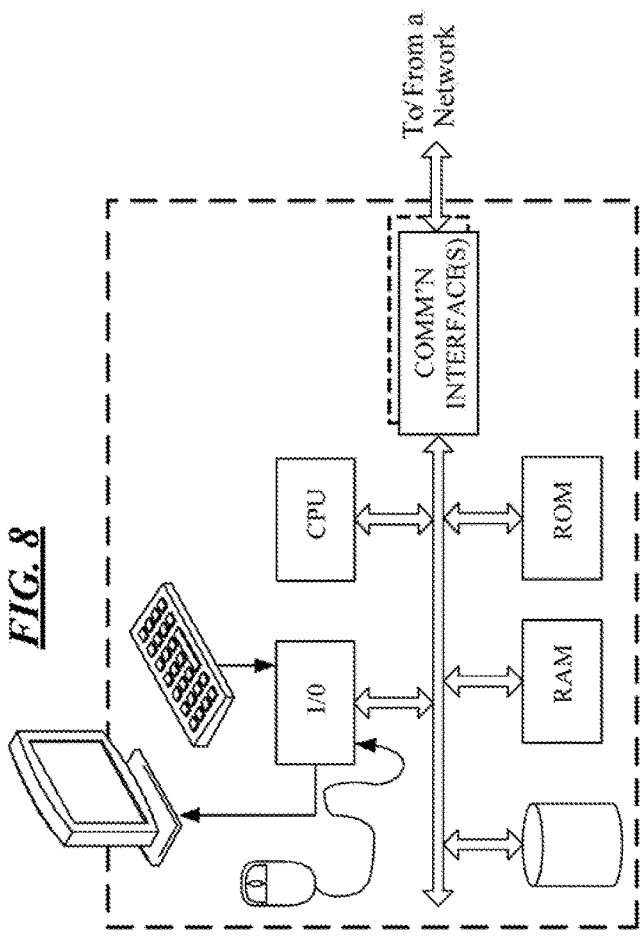
FIG. 8 is a simplified functional block diagram of a personal computer or other work station or terminal device usable for interaction with the server for software updates and/or with the system in the example of FIG. 1.

FIGS. 7 and 8 provide functional block diagram illustrations of general purpose computer hardware platforms. FIG. 7 illustrates a network or host computer platform, as may typically be used to implement a server, such as the cloud sever 133 for the firmware update service in FIG. 1. FIG. 8 depicts a computer with user interface elements, as may be used to implement a personal computer or other type of work station or terminal device like the terminal device 135 in FIG. 1, although the computer of FIG. 8 may also act as a server if appropriately programmed. It is believed that those skilled in the art are familiar with the structure, programming and general operation of such computer equipment and as a result the drawings should be self-explanatory.

A server type network connected computer platform, for example (FIG. 7), includes a data communication interface for packet data communication. The server computer also includes a central processing unit (CPU), in the form of circuit(s) for one or more processors, for executing program instructions. The server platform typically includes an internal communication bus, program storage and data storage for various data files to be processed and/or communicated by the server, although the server computer platform often receives and/or distributes programming and data via network communications through one or more packet data networks such as the network 131 in FIG. 1. The hardware elements, operating systems and programming languages of such server type computers are conventional in nature, and it is presumed that those skilled in the art are adequately familiar therewith. Of course, the server functions may be implemented in a distributed fashion on a number of similar hardware platforms, particularly to host the cloud service for firmware updates, so as to distribute the processing load.

A computer type user terminal device, such as a PC or tablet computer, similarly includes a data communication interface, a CPU, main memory and one or more mass storage devices for storing user data and the various executable programs (see FIG. 8). A mobile device type user terminal (not separately shown) may include similar elements, but will typically use smaller components that also require less power, to facilitate implementation in a portable form factor. The various types of user terminal devices will also include various user input and output elements. A personal computer other work station, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

As shown by the above discussion, some functions relating to the selective firmware update technique may be implemented on computers connected for data communication via the components of a nodal wireless network and/or a more general data network, operating as wireless enabled computing device, as a host or server platform for firmware update service or as a user terminal for interaction therewith as shown in FIG. 1. Although special purpose devices may be used for the wireless enabled computing device 101 and/or the server 133, such devices also may be implemented using one or more hardware platforms intended to represent a general class of data processing device commonly used to run gateway and/or "server" programming so as to implement the update controller or the cloud based firmware update service functions discussed above, albeit with an appropriate network connection for data communication with other equipment described above.

As known in the data processing and communications arts, a general-purpose computer typically comprises a central processor or other processing device, an internal communication bus, various types of memory or storage media (RAM, ROM, EEPROM, cache memory, flash memory, disk drives etc.) for code and data storage, and one or more network interface cards or ports for communication purposes, as shown in the hardware examples of FIGS. 6 to 8. The software functionalities of such computers or the like involve programming, including executable code as well as associated stored data, e.g. files used for the updated firmware images, etc. Some of the software code, may be executed by the gateway of FIG. 6 or by a more general purpose type wireless enabled computing device. Additional software code may be executable by the general-purpose computer like that of FIG. 7 that functions as server hosting the cloud based firmware update service 133. In operation, the code is stored within the particular platform, e.g. device 101 or server 133. At other times, however, the software may be stored at other locations and/or transported for loading into the appropriate general-purpose computer system. Execution of such code by a processor of the computer or other type platform enables the platform to implement portions of the selective firmware update methodology, in essentially the manner performed in the implementations discussed and illustrated herein.

Aspects of the selective software or firmware updating may be embodied in programming, for example, for the wireless enabled nodes, the wireless enabled computing device or for a computer server providing the cloud service for the updates. Programming for a wireless enabled node in the illustrated examples takes the form of firmware for the node processor typically the processor of the radio circuitry in the node. Programming for other programmable equipment may take the form of software. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the executable code and data of the programming. All or portions of the programming may at times be communicated through the Internet or various other telecommunication networks. The firmware updates in the examples are communicated via the WAN 131 and the wireless enabled network; and a firmware update may include programming to configure a node to implement the selective update procedure. By way of another example, communications via one or more networks may enable loading of software (e.g. an update or the update controller program) from one computer or processor into another, such as, from the server computer 133 hosting the cloud service for firmware updates to the gateway type computing device 101. Thus, another type of media that may bear the programming elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the programming. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the command set customization and distribution of software, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, flash memory in a nodal device, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The drawings and above discussed techniques represent just some examples of equipment and ways to implement selective software updating. It should be appreciated, however, that the update technologies admit of a range of modifications and alternate control applications.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that has, comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as ±10% from the recited amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected may lie in less than all features of any single disclosed example. Hence, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
    a wireless enabled computing device configured as an update controller, the computing device comprising a device processor, software storage, and a device radio frequency transceiver;
    a plurality of wireless enabled nodes configured into a nodal wireless network with the wireless enabled computing device, each respective wireless enabled node comprising a node radio frequency transceiver, a node processor, memory, and software stored in the memory for execution by the node processor to implement operations of the respective wireless enabled node, wherein:
    the plurality of wireless enabled nodes includes a wireless enabled node of a first type configured to execute stored software of a corresponding first type;
    the plurality of wireless enabled nodes includes a wireless enabled node of a second type different from the first type of wireless enabled node and configured to execute stored software of a corresponding second type different from the first type of software;
wherein the device processor configures the wireless enabled computing device to:
obtain a software update intended for each node of the first wireless enabled node type;
send an announcement of availability of the software update, through the wireless nodal network to the wireless enabled nodes, the announcement including an identifier of the first type of wireless enabled node;
receive a packet request from the wireless enabled node of the first type through the wireless nodal network sent in response to the announcement including the identifier of the first type of wireless enabled node; and
in response to the received packet request, send a number of packets from the wireless enabled computing device through the wireless nodal network to the wireless enabled nodes, each packet containing the identifier of the first type of wireless enabled node, and various ones of the packets containing different portions of the software update;
wherein the respective node processor of the wireless enabled node of the first type configures the wireless enabled node of the first type to:
based on recognition of the identifier of the first type of wireless enabled node in the packets, accumulate the portions of the software update from received packets to obtain a complete copy of the software update; and
install the complete copy of the software update for future execution; and
wherein the respective node processor of the wireless enabled node of the second type configures the wireless enabled node of the second type to discard the received packets including the portions of the software update, based on recognition of the identifier of the first type of wireless enabled node in the received packets.

2. The system of claim 1, wherein while receiving the transmitted packets through the wireless nodal network or before installing the complete copy of the software update, the respective node processor of the wireless enabled node of the second type further configures the wireless enabled node of the first type to:
receive a packet request for at least one of the received packets from a requesting wireless enabled node; and
transmit the requested at least one of the received packets through the wireless nodal network for at least the requesting wireless enabled node.

3. The system of claim 1, wherein before discard of the packets, the respective node processor of the wireless enabled node of the second type further configures the wireless enabled node of the second type to:
temporarily store the received packets in memory of wireless enabled node of the second type;
receive a packet request for at least one of the received packets from a requesting wireless enabled node, at the wireless enabled node of the second type; and
transmit the requested at least one of the received packets from the other wireless enabled node of the second type through the wireless nodal network for at least the requesting wireless enabled node.

4. The system of claim 1, wherein, in each respective one or a plurality of the wireless enabled nodes, the respective node radio frequency transceiver, the respective node processor and the respective memory are elements of a respective single radio circuit.

5. The system of claim 4, wherein each respective single radio circuit is an integrated system-on-a-chip (SoC).

6. The system of claim 1, wherein:
in each respective wireless enabled node, the node radio frequency transceiver, the node processor and the memory are elements of a single radio circuit;
the radio circuit of the first wireless enabled node has a first type node processor or a first capacity memory;
the radio circuit of the second wireless enabled node has a second type node processor different from the first type node processor or a second capacity memory different from the first capacity memory; and
the software update intended for each node of the first wireless enabled node type conforms to the first type node processor or to the first capacity of the first memory.

7. The system of claim 1, wherein at least a plurality of the wireless enabled nodes are configured as light fixtures, each including a light source and a corresponding driver circuit.

8. The system of claim 7, wherein:
the light fixture of the first wireless enabled node has a first type light source and a corresponding first type driver circuit;
the light fixture of the second wireless enabled node has a second type light source and a corresponding second type driver circuit different the first type light source and first type driver circuit; and
the software update intended for each node of the first wireless enabled node type is configured to facilitate control of the first type light source via the first type driver circuit.

9. The system of claim 1, wherein:
in each respective one of the of wireless enabled nodes, the software stored in the memory of the respective wireless enabled node is firmware for execution by the node processor of the respective wireless enabled node; and
the software update is a firmware update.

10. A method comprising steps of:
obtaining, via a wireless enabled computing device, a software update intended for a first one of a plurality of different types of wireless enabled nodes deployed in a wireless nodal network;
operating the wireless enabled computing device to send an announcement of availability of the software update through the wireless nodal network to the wireless enabled nodes, the announcement including an identifier of the first type of wireless enabled node;
receiving at the wireless enabled computing device a packet request from at least one of the wireless enabled nodes deployed in the wireless nodal network sent in response to the announcement based on a determination responsive to the identifier in the announcement that the at least one of the wireless enabled nodes is of the first type;
in response to the received packet request, sending a number of packets from the wireless enabled computing device through the wireless nodal network to the wireless enabled nodes, wherein:
each packet contains the identifier of the first type of wireless enabled node, and
various ones of the packets contain different portions of the software update;

receiving the transmitted packets through the wireless nodal network at the wireless enabled nodes;

based on recognition of the identifier of the first type of wireless enabled node in the packets, each respective wireless enabled node of the first type:

(a) accumulating the portions of the software update from the received packets to obtain a complete copy of the software update, and (b) installing the complete copy of the software update for future execution; and another wireless enabled node, of a second type different from the first type of wireless enabled node, discarding the received packets including the portions of the software update, responsive to recognition of the identifier of the first type of wireless enabled node in the received packets.

11. The method of claim 10, wherein the software update is a firmware update.

12. The method of claim 10, further comprising, while receiving the transmitted packets through the wireless nodal network or before installing the complete copy of the software update:

receiving a packet request for at least one of the received packets from a requesting wireless enabled node, at one node of the first type; and transmitting the requested at least one of the received packets from the one node of the first type through the wireless nodal network for at least the requesting wireless enabled node.

13. The method of claim 10, further comprising, while receiving the transmitted packets through the wireless nodal network or before discarding the transmitted packets:

temporarily storing the received packets in memory of the other wireless enabled node;

receiving a packet request for at least one of the received packets from a requesting wireless enabled node, at the other wireless enabled node; and transmitting the requested at least one of the received packets from the other wireless enabled node through the wireless nodal network for at least the requesting wireless enabled node.

14. The method of claim 10; wherein:

the announcement of availability of the software update further includes a packet count indicating total number of packets for communication of the software update;

the steps of receiving a packet request and sending a number of packets are repeated multiple times, each repetition communicating a number of packets smaller in number than the total packet count, until total number of packets transmitted reaches the total packet count;

portions of the software update contained in the smaller number of packets sent in each repetition of the sending step are different; and portions of the software update contained in the total number of packets transmitted together form the complete copy of the software copy for future execution.

* * * * *